United States Patent
Takeishi et al.

(10) Patent No.: US 9,321,906 B2
(45) Date of Patent: Apr. 26, 2016

(54) THERMOPLASTIC RESIN COMPOSITE CONTAINING HOLLOW GLASS MICROSHERES

(75) Inventors: Towako Takeishi, Kanagawa (JP); Takujiro Yamabe, Kanagawa (JP); Kyoko Takakuwa, Kanagawa (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/115,046

(22) PCT Filed: May 1, 2012

(86) PCT No.: PCT/US2012/035939
§ 371 (c)(1),
(2), (4) Date: Oct. 31, 2013

(87) PCT Pub. No.: WO2012/151178
PCT Pub. Date: Nov. 8, 2012

(65) Prior Publication Data
US 2014/0088244 A1   Mar. 27, 2014

(30) Foreign Application Priority Data
May 2, 2011   (JP) ................................. 2011-102637

(51) Int. Cl.
| | | |
|---|---|---|
| C08J 9/32 | (2006.01) |
| C08K 7/28 | (2006.01) |
| C08K 5/544 | (2006.01) |
| C08L 23/10 | (2006.01) |
| C08L 77/02 | (2006.01) |
| C08L 77/06 | (2006.01) |
| C08K 9/06 | (2006.01) |
| C08K 9/08 | (2006.01) |
| C03C 11/00 | (2006.01) |
| C09C 3/10 | (2006.01) |
| C09C 1/28 | (2006.01) |
| C03C 17/30 | (2006.01) |
| C03C 17/32 | (2006.01) |

(52) U.S. Cl.
CPC ................. *C08K 7/28* (2013.01); *C03C 11/002* (2013.01); *C03C 17/30* (2013.01); *C03C 17/32* (2013.01); *C08K 5/544* (2013.01); *C08K 9/06* (2013.01); *C08K 9/08* (2013.01); *C08L 23/10* (2013.01); *C08L 77/02* (2013.01); *C08L 77/06* (2013.01); *C09C 1/28* (2013.01); *C09C 3/10* (2013.01); *C01P 2004/34* (2013.01)

(58) Field of Classification Search
CPC .......... C08L 23/10; C08L 77/02; C08L 77/06; C08K 5/544; C08K 7/28
USPC .................................................. 523/214, 219
See application file for complete search history.

(56) References Cited

U.S. PATENT DOCUMENTS

| | | |
|---|---|---|
| 5,032,627 A | 7/1991 | Wilson et al. |
| 2003/0134920 A1 | 7/2003 | Poisl et al. |
| 2006/0105053 A1 | 5/2006 | Marx et al. |
| 2007/0155858 A1 | 7/2007 | Israelson |
| 2009/0206512 A1 | 8/2009 | Campbell et al. |
| 2010/0279100 A1* | 11/2010 | Heikkila et al. ........... 428/313.9 |

FOREIGN PATENT DOCUMENTS

| | | |
|---|---|---|
| JP | H0379644 A | 4/1991 |
| JP | H04295030 A | 10/1992 |
| JP | H04295031 A | 10/1992 |
| JP | 5-139783 A | 6/1993 |
| JP | 5-171032 A | 7/1993 |
| JP | H06226771 A | 8/1994 |
| JP | H06-316452 A | 11/1994 |
| JP | 20070102027 A | 10/2007 |
| JP | 2007297432 A | 11/2007 |
| WO | 96/13548 A1 | 5/1996 |
| WO | 0114273 A1 | 3/2001 |

OTHER PUBLICATIONS

European Extended Search Report for Application No. 12779861.9, dated Aug. 21, 2014, 9 pages.

* cited by examiner

*Primary Examiner* — Edward Cain
(74) *Attorney, Agent, or Firm* — C. Michael Geise

(57) ABSTRACT

A thermoplastic resin composite with improved specific flexural strength, and a molded body containing the thermoplastic resin composite. A thermoplastic resin composite containing a resin component which is a polyamide resin or polypropylene resin, and hollow glass microspheres, wherein the hollow glass microspheres are surface treated with from 0.5 to 3 mass % of a silane coupling agent and from 1 to 5 mass % of a synthetic resin emulsion, based on 100 mass % of hollow glass microspheres.

3 Claims, No Drawings

THERMOPLASTIC RESIN COMPOSITE CONTAINING HOLLOW GLASS MICROSHERES

TECHNICAL FIELD

The present description relates to a thermoplastic resin composite containing hollow glass microspheres, and to a molded body containing the thermoplastic resin composite.

BACKGROUND

Conventionally, resin composites and molded bodies of these resin composites are made lighter by adding hollow glass microspheres to a resin material. Furthermore, methods of processing the hollow glass microspheres that are added to the resin material have been investigated in order to improve the mechanical properties of the resin composite and molded bodies of the resin composite.

Japanese Unexamined Patent Application Publication No. H5-139783 discloses hollow glass microsheres coated with a resin, and a composition for molding that contains the hollow glass microsheres, containing a matrix resin and a thermoplastic elastomer with a flexural modulus of 100 to 1200 kg/cm2.

Japanese Unexamined Patent Application Publication No. H5-171032 discloses a reinforced thermoplastic resin composition which contains a resin compound where modified polyethylene ether resin forms a dispersion phase and a polyamide resin (b) forms a continuous phase, glass fiber (Y) having aminosilane treated surfaces, and hollow glass microsheres, wherein the glass fibers are coated by the modified polyphenylene ether resin. Japanese Unexamined Patent Application Publication No. 2007-517127 discloses a thermoplastic resin composite with a filling material, containing at least one type of polyamide, and glass bubbles with a crushing strength of at least 10,000 PSI that have been treated with at least one of a silane coupling agent or a titanate coupling agent.

When hollow glass microspheres are added to a resin material, the material can be made lighter, but on the other hand, there is a tendency for mechanical properties such as specific tensile strength, specific flexural strength, and the like of an obtained resin composite or of a molded body made from this resin composite to be inferior. Therefore, attempts have been made to treat surfaces of the hollow glass microspheres with a silane coupling agent. The mechanical properties required in the fields of electronic components and automotive components may not be achievable with such surface treatments.

SUMMARY

There is a demand for an effective and simple surface treatment method for hollow glass microspheres in order to maintain and improve the mechanical properties of a resin composite that has been made lighter by adding hollow glass microspheres.

One aspect of the present description provides a thermoplastic resin composite that contains a polyamide resin and hollow glass microspheres. The hollow glass microspheres are surface treated with from 0.5 to 3 mass % of a silane coupling agent and from 1 to 5 mass % of a synthetic resin emulsion, based on 100 mass % of the hollow glass microspheres.

Furthermore, one aspect of the present description is a thermoplastic resin composite containing polypropylene resin and hollow glass microspheres, wherein the hollow glass microspheres are surface treated with 0.5 to 3 mass % of a silane coupling agent and 1 to 5 mass % of a synthetic resin emulsion, based on 100 mass % of the hollow glass microspheres.

Furthermore, one aspect of the present description relates to a molded body containing at least one of the aforementioned thermoplastic resin composites.

The molded body containing the thermoplastic resin composite of the present description has improved specific flexural strength as compared to a molded body including conventional thermoplastic resin composite containing hollow glass microspheres.

DETAILED DESCRIPTION

First, the resin component of the thermoplastic resin composite of the present description is described.

A polyamide resin is a polymer compound having a CO—NH bond in the main chain, and for example, can be obtained by condensation of a diamine and a dicarboxylic acid, by ring opening polymerization of lactam, or self-condensation of an amino carboxylic acid.

Examples of diamines include straight chain aliphatic diamines such as hexamethylene diamine, pentamethylene diamine, and the like; branched aliphatic amines such as 2-methyl pentane diamine, 2-ethyl hexylmethylene diamine, 2-methyl pentane diamine, and the like, aromatic diamines such as meta or para-phenylene diamine and the like; and alicyclic diamines such as cyclohexane diamine, cyclopentane diamine, and the like.

Furthermore, examples of the dicarboxylic acid component include aromatic dicarboxylic acids such as terephthalic acid, isophthalic acid, and the like; and aliphatic dicarboxylic acids such as adipic acid, sebacic acid, and the like.

Examples of lactams include pyrrolidone, aminocaproic acid, $\epsilon$-caprolactam, undecanlactam, lauryl lactam, and the like.

Furthermore, examples of amino carboxylic acids include amino fatty acids, which are compounds of the aforementioned lactams that have been ring opened by water.

From the perspective of strength, examples of polyamide resins include aliphatic polyamide, semi-aliphatic polyamide, and blends thereof, as well as copolymers of these polyamides and blends thereof.

Specific examples of aliphatic polyamide include polyamide 4 (poly α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, and polyamide 612.

Specific examples of semi-aromatic polyamides include polyamide 6T (polyhexamethylene terephthalamide), polyamide 9T (polynonamethylene terephthalamide), polyamide 6I (polyhexamethylene isophthalamide), and copolymers thereof and the like.

Furthermore, examples of copolymers of these polyamides include hexamethylene adipamide and hexamethylene terephthalamide copolymer, hexamethylene adipamide and hexamethylene isophthalamide copolymer, hexamethylene terephthalamide and 2-methyl pentane diamine terephthalamide copolymer, and the like.

In one aspect, an aliphatic polyamide is preferable, and of these, polyamide 6 and polyamide 66 are more preferable.

A molecular weight of the polyamide resin is preferably in a range of 10,000 to 50,000, and particularly preferably in a range of 14,000 to 30,000. If the molecular weight is in a range of 10,000 to 50,000, processability during molding will be favorable, and mechanical strength of the molded parts will be stable.

A relative viscosity in a sulfuric acid solution (concentration 1 g/100 mL) (hereinafter simply referred to as relative viscosity) is preferably from 1.5 to 4.0. If the relative viscosity is less than 1.5, cohesiveness during melting and kneading will be inferior, but if larger than 4, fluidity will be inferior, and there is a possibility that the molding processability will be degraded.

Examples of commercial polyamide resins include product name "Nylon" (polyamide-6 and polyamide-6,6, products of DuPont), product name "Ube Nylon" (polyamide-6 and polyamide-6,6, product of Ube Industries), product name "AMILAN" (polyamide-6 and polyamide-6,6, product of Toray), product name "Leona" (polyamide-6,6, product of Asahi Kasei), and the like.

From the perspective of fluidity of the molten resin during molding, an amount of polyamide resin in the thermoplastic resin composite is preferably 20 mass % or more with regards to a total amount of thermoplastic resin composite, more preferably 25 mass % or more, and most preferably 30 mass % or more. Furthermore, from the perspective of strength, the amount is preferably 90 mass % or less with regards to the total amount of thermoplastic resin composite, more preferably 80 mass % or less, and most preferably 70 mass % or less.

The polypropylene resin can be a commonly known polypropylene resin such as propylene homopolymer, propylene-$\alpha$-olefin block copolymer, propylene-$\alpha$-olefin random copolymer, and the like, without restriction.

Herein, examples of the $\alpha$-olefin that is copolymerized with the propylene include $\alpha$-olefins with from 2 to 20 carbon atoms, such as ethylene, 1-butene, 3-methyl-1-pentene, 4-methyl-1-pentene, 1-hexene, 1-octene, 1-decene, and the like. Of these, $\alpha$-olefins with from 2 to 10 carbon atoms such as ethylene, 1-butene, and 1-octene, and the like are preferable from the perspective of impact resistance. The $\alpha$-olefin that is copolymerized with the propylene can be a single type used individually, or can be two or more types used in combination. Furthermore, from the perspective of thermal resistance, an amount of $\alpha$-olefin that is copolymerized with the propylene is preferably 20 mol % or less with regards to a total amount of propylene and $\alpha$-olefin.

The polypropylene resin that is used with the present description is preferably a propylene homopolymer containing crystalline polypropylene resin or a propylene $\alpha$-olefin block copolymer.

A molecular weight of the polypropylene resin is generally from 5000 to 500,000, but polypropylene resin with a molecular weight of 10,000 to 100,000 is preferable from the perspective of moldability. Furthermore, the polypropylene resin normally has a melt flow rate (in conformance with ASTM D1238, 230° C., 2.16 kg load) of 0.01 g to 200 g/10 minutes, but from the perspective of fluidity, polypropylene resin with a melt flow rate of 0.5 to 100 g/10 minutes is preferable.

Examples of commercial polypropylene resins include product name "Prime Polypro" (product of Prime Polymer), product name "Novatec PP" (product of Nippon Polypro), product name "Sumitomo Noblen" (product of Sumitomo Chemical), product name "Sunallomer" (product of Sunallomer), and the like.

From the perspective of molten resin fluidity during molding, an amount of polypropylene resin in the thermoplastic resin composite is preferably 40 mass % or more with regards to the total amount of thermoplastic resin composite, more preferably 45 mass % or more, and most preferably 50 mass % or more. Furthermore, from the perspective of rigidity of the molded part obtained, the amount is preferably 80 mass % or less with regards to the total amount of thermoplastic resin composite, more preferably 70 mass % or less, and most preferably 60 mass % or less.

Next, the hollow glass microspheres are described. The hollow glass microspheres have a core and shell construction, where the core is hollow, and is filled with a gas either at atmospheric pressure or at reduced pressure. The shell is primarily made of glass containing silicon dioxide ($SiO_2$) as a main component, with sodium oxide ($NaO_2$), magnesium oxide ($MgO$), calcium oxide ($CaO$), boron oxide ($B_2O_5$), phosphorus oxide ($P_2O_5$), and the like as accessory components.

The hollow glass microspheres preferably have an aspect ratio within a range of 0.85≤(short axis/long axis), more preferably 0.90≤(short axis/long axis), and most preferably 0.95≤(short axis/long axis). If the aspect ratio of the hollow glass microspheres is low, there will be a tendency for high shear force to act during molten plastic compounding or during molding, stress concentration will occur, the hollow condition will not be possible to maintain, and the hollow glass microspheres may be crushed.

Furthermore, the hollow glass microspheres preferably have a 10 volume % isostatic collapse strength of 8000 PSI (55 MPa) or higher, more preferably 10,000 PSI (69 MPa) or higher, and most preferably 16,000 PSI (110 MPa) or higher. If the 10 volume % isostatic collapse strength of the hollow glass microspheres is low, high shear forces during plastic compounding or during molding will act, and the hollow glass microspheres may be crushed. Herein, the 10 volume % isostatic collapse strength of the hollow glass microspheres is defined by ASTM D-3102-78, where an appropriate quantity of glass bubbles are placed in glycerin and pressurized, and the pressure where 10 volume % are crushed is used as an indicator.

Furthermore, with regards to a size of the hollow glass microspheres, a median diameter (volumetric % diameter) is preferably from 10 μm to 70 μm, more preferably from 10 μm to 35 μm. Furthermore, a 90 volume % diameter is preferably controlled within a range of 30 μm to 200 μm, more preferably 30 μm to 70 μm. The size of the hollow glass microspheres can be measured using a commercial laser diffraction particle size analyzer (wet type, recirculating).

Industrially, the hollow glass microspheres are usually manufactured by foaming glass, and some degree of correlation is seen between the median diameter size and the 10 volume % isostatic collapse strength, so it is commonly known that the size of the hollow glass microspheres must be maintained relatively small. Therefore, the median diameter (volume % diameter) and the 90 volume % diameter are preferably within the aforementioned ranges. Generally, it has been confirmed that the 10 volume % isostatic collapse strength will have a tendency to be lower as the size increases.

Furthermore, the hollow glass microspheres preferably have a true density of 0.9 g/cm$^3$ or less. This is because the density of the resin component that is added to the thermoplastic resin composite is generally from 1 to 1.2 g/cm$^3$ for polyamide resin and from 0.9 to 1.2 g/cm$^3$ for polypropylene resin, and therefore if the hollow glass microspheres do not have a lower density than the density of the resin composition, the effect of reducing weight will be difficult to achieve. The true density of the hollow glass microspheres is measured using a pycnometer (gas phase replacement type true density meter, such as AccuPyc II 1340 manufactured by Micromeritics).

An example of commercial hollow glass microspheres that can be used is 3M (trademark) Glass Bubbles. Grades of product that can be used include S60HS (true density 0.6 g/cm$^3$, 10 volume % isostatic collapse strength 18,000 PSI or higher (124 MPa or higher)), iM30K (true density 0.6 g/cm$^3$, 10 volume % isostatic collapse strength 27,000 PSI or higher (186 MPa or higher)), S60 (true density 0.6 g/cm$^3$, 10 volume % isostatic collapse strength 10,000 PSI or higher (69 MPa)), K42HS (true density 0.42 g/cm$^3$, 10 volume % isostatic collapse strength 8000 PSI or higher (55 MPa or higher)), or the like.

Note that examples of commercial hollow glass microspheres include Shirasu balloons such as Winlight (MSB type, WB type, and SC type) provided by AXYZ Chemical Co., Ltd. However, Shirasu balloons generally have a broad size range of 5 to 500 μm, and the true density also has large variation from 0.6 g/cm$^3$ to 1.1 g/cm$^3$. Furthermore, the 10 volume % isostatic collapse strength is generally approximately 8 to 10 MPa (measured when static water pressure is applied for 2 minutes). Therefore, the Shirasu balloons have a true density that is too high, the weight reducing effect is low, and the 10 volume % isostatic collapse strength is low, so 3M glass bubbles are preferably selected as the commercial product of the hollow glass microspheres that is used.

The hollow glass microspheres are surface treated with from 0.5 to 3 mass % of a silane coupling agent and from 1 to 5 mass % of a synthetic resin emulsion, based on 100 mass % of the hollow glass microspheres.

The silane coupling agent that is used with the present description is a silane compound that has a hydrolyzable group and a hydrophobic group (organic group), and examples include silane coupling agents with an unsaturated double bond such as vinyl triethoxysilane, vinyl trimethoxysilane, and the like; silane coupling agents with an epoxy group such as β-(3,4-epoxy cyclohexylethyl)trimethoxysilane, γ-glycidyloxy propyl trimethoxysilane, and the like; silane coupling agents having a mercapto group such as γ-mercaptopropyl trimethoxysilane and the like; silane coupling agents having a methacryloxy group such as methacryloxypropyl trimethoxysilane and the like; and silane coupling agents having an amino group such as γ-aminopropyl trimethoxysilane, γ-aminopropyl triethoxysilane, and the like. Of these, amino silane coupling agents that have an amino group such as γ-aminopropyl trimethoxysilane, γ-aminopropyl triethoxysilane, and the like are preferable from the perspective of compatibility with polyamide resins and strong hydrolysis reactivity. Specific examples of commercial products include product name "KBE-903" (3-aminopropyl triethoxysilane, product of Shinetsu Chemical) and the like.

An amount of silane coupling agent surface treatment is generally calculated from a surface area of the hollow glass microspheres and a minimum coating area of the silane coupling agent. If the amount of silane coupling agent surface treatment is less than the aforementioned amount, film thickness of the silane coupling agent film that is formed on the surface of the hollow glass microspheres will be too thin, or film will not form in some areas, and therefore the effect of improving the mechanical strength will be insufficient. On the other hand, if the amount of surface treatment of the silane coupling agent exceeds 3 mass %, a sufficient amount of silane coupling agent will already exist on the surface of the hollow glass microspheres, and therefore even if additional silane coupling agent is added, an effect of further increasing the mechanical strength will not be demonstrated, and the excess silane coupling agent may cause flocculation of the hollow glass microspheres, and thus this condition is not preferable from the perspective of economics and practicality.

The synthetic resin emulsion is an aqueous dispersion of a synthetic resin, such as a polyamide emulsion, polyether based urethane emulsion, maleic acid modified polypropylene (PP) emulsion, and the like. Note, with the present description, the synthetic resin emulsion can be an emulsion manufactured by any commonly known method. In one aspect, a polyamide emulsion or a maleic acid modified polypropylene (PP) emulsion is preferably used. Specific examples of commercial products include product name "MGP-1650" (maleic anhydride modified PP emulsion, product of Maruyoshi Chemical), product name "Sepolution PA200" (polyamide emulsion, product of Sumitomo Seika Chemicals), product name "Tresin FS-350E5AS" (water soluble polyamide emulsion, product of Nagase Chemtec), product name "Chemithylene GA-500" (polyether based urethane emulsion, product of Sanyo Chemical), product name "Bondic 194 ONE" (polyether based urethane emulsion, product of DIC Corporation), product name "jER816C/FL240" (epoxy resin, product of Japan epoxy resin), and the like.

An amount of synthetic resin emulsion added is preferably from 0.5 to 5 mass % with regards to a solid fraction of the synthetic resin. If the amount of synthetic resin emulsion that is added is less than 0.5 mass %, the synthetic resin emulsion will not easily exist uniformly on the surface of the hollow glass microspheres, and the effect of adding the synthetic resin emulsion will not be sufficiently demonstrated. On the other hand, an amount of synthetic resin emulsion that exceeds 5 mass % is functionally undesirable because the hollow glass microspheres that are dried after adding the synthetic resin emulsion will clump because of the excess synthetic resin emulsion.

The method of treating the surface of the hollow glass microspheres using the silane coupling agent and the synthetic resin emulsion is not particularly restricted. In one aspect, a method where the silane coupling agent and the synthetic resin emulsion are simultaneously (for example as a mixture) added by drops can be used. Furthermore, a method where the silane coupling agent is first added by drops, and then the synthetic resin emulsion is added by drops is also possible.

An amount of hollow glass microspheres in the thermoplastic resin composite is preferably 50 volume % or less, with regards to the thermoplastic resin composite. Note, although depending on the type of resin component that is added, if a density of the polypropylene resin is from 0.90 g/cm$^3$ to 0.91 g/cm$^3$, and a density of the polyamide resin is from 1.02 g/cm$^3$ to 1.18 g/cm$^3$, the amount of hollow glass microspheres is calculated to be from approximately 25 mass % to approximately 35 mass % or less. If a volumetric ratio of the hollow glass microspheres in the thermoplastic resin composite exceeds 50 volume %, the contribution of the properties derived from the hollow glass microspheres will be large. A twin screw extruder is often used when compounding the resin composite, but in this case, the strands obtained will easily tear, and creating pellets by pulling strands will be difficult. On the other hand, from the perspective of reducing weight, the amount of hollow glass microspheres in this thermoplastic resin composite is preferably 10 volume % or higher (approximately 5 to 10 mass % or higher) with regards to the thermoplastic resin composite.

Other inorganic fillers besides the hollow glass microspheres can be added to the thermoplastic resin composite. Specific examples include talc, mica, clay, wollastonite, calcium carbonate, barium sulfate, diatomaceous earth, basic magnesium sulfate, and the like, and one or more of these fillers can be appropriately used. A total amount of hollow glass microspheres and inorganic fillers other than hollow glass microsheres is preferably 50 volume % or less, with regards to the thermoplastic resin composite.

A manufacturing method of the thermoplastic resin composite is not particularly restricted, and manufacturing of the thermoplastic resin composite can be performed in accordance with a manufacturing method that is conventionally used. For example, a process can be suggested where the components that make up the thermoplastic resin composite are kneaded (or preliminarily mixed in a separate kneader, and then kneaded) using a continuous kneader, a single screw extruder, a twin screw extruder, or the like, and then the kneaded material obtained is extruded into strands, the strands are cut into pellets, dried, granulated, and then molded. If a twin screw extruder is used, the manufacturing method described in detail below is standard.

First, the thermoplastic resin is fed from a main hopper using a twin screw extruder. Next, when the thermoplastic resin is melted to some degree, a side feeder is attached and hollow glass microsheres are fed from the side feeder. Furthermore, the thermoplastic resin and the hollow glass microsheres are kneaded together to obtain the thermoplastic resin composite. Note that a kneading temperature is normally set to a temperature from 20 to 30° C. higher than the case where the hollow glass microspheres are not added. Furthermore, in order to minimize crushing of the hollow glass microsheres, the screw is preferably selected from those that have low mixing effect.

A method of molding the thermoplastic resin composite is not particularly restricted, and methods such as injection molding, injection compression molding, compression molding, blow molding, and the like can be appropriately used depending on the use of the thermoplastic resin composite.

The molded body obtained from the thermoplastic resin composite of the present description can be used as exterior components, structural components, or mechanical components or the like of automobiles, electronic components, standard equipment, and the like. For automotive applications, exterior components represented by bumpers and rocker panels, interior components represented by instrument panels and the like, and engine components represented by intake manifolds, engine covers, and the like can be suggested. Furthermore, use for electrical components such as refrigerators, televisions, copiers and printers, and the like is also possible.

EMBODIMENTS

Embodiment 1

A thermoplastic resin composite comprising polyamide resin and hollow glass microspheres, wherein the hollow glass microspheres are surface treated with from 0.5 to 3 mass % of a silane coupling agent and from 1 to 5 mass % of a synthetic resin emulsion, based on 100 mass % of the hollow glass microspheres.

Embodiment 2

A thermoplastic resin composite comprising polypropylene resin and hollow glass microspheres, wherein the hollow glass microspheres are surface treated with 0.5 to 3 mass % of a silane coupling agent and 1 to 5 mass % of a synthetic resin emulsion, based on 100 mass % of the hollow glass microspheres.

Embodiment 3

The thermoplastic resin composite according to embodiment 1 or 2, wherein the silane coupling agent is an amino silane coupling agent.

Embodiment 4

The thermoplastic resin composite according to any one of embodiment 1 through 3, wherein the synthetic resin emulsion is a polyamide emulsion or a maleic acid modified polypropylene emulsion.

Embodiment 5

A molded body containing a thermoplastic resin composite according to any one of embodiment 1 through 4.

Embodiment 6

Hollow glass microspheres that are surface treated with from 0.5 to 3 mass % of an amino silane coupling agent and from 1 to 5 mass % of a synthetic resin emulsion, based on 100 mass % of the hollow glass microspheres.

EXAMPLES

Examples of the present description are described below in detail, but the present description is not restricted to these examples.

Preparing Polyamide 6,6 Resin Composite Samples
Preparing the Surface Treated Hollow Glass Microspheres Surface treated hollow glass microsphere samples 1 through 6 were fabricated using the following method. First, 500 g of glass bubbles (product name: S60HS, manufactured by 3M) were placed in a 14 L metal container and stirred with a mixing blade. While mixing, in accordance with Table 1, a surface treatment agent was added by drops at one time as a mixture (samples 1 and 2), or was added by drops in order of a silane coupling agent and then a synthetic resin emulsion (samples 3 through 6) onto the glass bubbles. After mixing for 3 minutes, the glass bubbles that had adhered to the wall surface of the metal container were removed and stirred into the center part of the sample and then mixed again. Next, after 3 minutes, the surface treated samples were removed, and dried for 30 minutes in an oven at 100° C. After drying, the samples were cooled to room temperature and classified using a 500 μm mesh sieve to obtain hollow glass microsphere samples 1 through 6.

Preparing the Polyamide 6,6 Resin Composite Sample

Thermoplastic resin composite samples, which were resin composites of polyamide resins prepared by the following procedures, were prepared using the hollow glass microsphere samples 1 through 6. First, 10 mass % of the hollow glass microsphere samples were kneaded into polyamide 6,6 (AMILAN CM3001-N (product of Toray)) using a unidirectional rotating twin screw extruder HK25D with a 25 mm diameter and L/D=41 (manufactured by Parker Corporation). The discharge rate of the twin-screw extruder was 5.4 kg/h, the screw speed was 150 RPM, and the resin temperature was from 256 to 257° C. The resin component was provided through a top feeder hole, and the surface treated glass bubbles were added from a side feeder. The strand that was extruded from the extruding orifice was cooled, cut into 3 mm long pellets, and then dried to obtain pellets of a thermoplastic resin composite of polyamide resin.

Note that as a comparative example 1, thermoplastic resin composite pallets were obtained by kneading under the same conditions as the example, except that 10 mass % of commercial hollow glass microspheres (product name: S60HS (product without surface treatment), manufactured by 3M) was used.

Injection Molding

Injection molding was performed under the following conditions using the thermoplastic resin composite samples to produce molded body samples. The pellet samples that were prepared were molded using a multipurpose test resin mold according to JIS K7139 (ISO3167) type A using an injection molder FNX140 (manufactured by Nissei Plastic Industrial). The molding conditions were set to a cylinder temperature of 280 to 290° C., a mold temperature of 80 to 90° C., and an injection pressure of 45 to 80 MPa.

The molded body samples prepared by the aforementioned methods (examples 1 through 6 and comparative example 1) and molded body samples obtained from polyamide resin that did not contain hollow glass microspheres (reference example 1) were evaluated by the following methods. The evaluation results are shown in Table 1.

Density and Weight Reducing Ratio

The density of the test piece was measured at room temperature using an electric hydrometer (SD-200L, product of Mirage Trading). The measurement was performed by the test methods in accordance with JIS-K7112:1999 and ISO-1183:1987. Furthermore, the weight reducing ratio was a value obtained by subtracting the density after adding the additive compound from the density of the glass microscopic hollow body resin material, and then dividing by the density of the base material.

Flexural Strength, Specific Flexural Strength, Flexural Modulus, Relative Rigidity The flexural strength, flexural modulus, and relative rigidity were each measured using a tensile compression tester (Strograph (V10-C) manufactured by Toyo Seiki). The test method was performed under a load of 500 N as the compression conditions, and at a speed of 2 mm/minute, in conformance with JIS-K7171:1994 and ISO-178:1993. The flexural strength was the maximum bending strength, and was measured by leaving a test piece in a 100° C. oven for 10 hours or more, and then measuring at room temperature in a so-called dry condition that contains no water. Furthermore, the specific flexural strength was a value obtained by dividing the flexural strength obtained by the density of the test piece. The relative rigidity was a value obtained by dividing the cube root of the flexural modulus obtained by the density of the test piece.

Tensile Strength, Specific Tensile Strength

The tensile strength was measured using a tensile compression tester (Strograph (V10-C) manufactured by Toyo Seiki), similar to the flexural strength. The test method was in conformance with JIS-K7161:1994, ISO-527:1993, JIS-K7162:1994, and ISO-527-2:1993, and testing was performed under a load of 10 kN and a speed of 50 mm/minute. The tensile strength was the maximum tensile strength, and the test piece was measured in a dry condition at room temperature after leaving for 10 hours or more in an oven at 100° C. Furthermore, the specific tensile strength was a value determined by dividing the tensile strength obtained by the density of the test piece.

TABLE 1

Polyamide 6,6 Resin Compound Material

| | | Reference Example 1 | Example 1 | Example 2 | Example 3 | Example 4 | Example 5 | Example 6 | Comparative Example 1 |
|---|---|---|---|---|---|---|---|---|---|
| Polyamide 6,6 resin | Mass % | 100 | 90 | 90 | 90 | 90 | 90 | 90 | 90 |
| Hollow glass microspheres | Sample No. | — | 1 | 2 | 3 | 4 | 5 | 6 | — |
| | Mass % | | 10 | 10 | 10 | 10 | 10 | 10 | 10 |
| Surface treatment agent | Al (mass %) | | 1 | 1 | 1 | 1 | 1 | 1 | |
| | PAEm1 (mass %) | | 2 | | | | | | |
| | PAEm2 (mass %) | | | 2 | | | | | |
| | UEm1 (mass %) | | | | 2 | | | | |
| | UEm2 (mass %) | | | | | 2 | | | |
| | mPPEm (mass %) | | | | | | 2 | | |
| | Ep (mass %) | | | | | | | 2 | |
| Density (g/cm³) | | 1.13 | 1.05 | 1.06 | 1.06 | 1.06 | 1.06 | 1.06 | 1.05 |
| Weight reducing ratio (%) | | 0 | 7 | 6 | 7 | 7 | 7 | 7 | 7 |
| Flexural strength (MPa) | | 109 | 123 | 121 | 122 | 123 | 120 | 121 | 109 |
| Specific flexural strength (MPa/(g/cm³)) | | 96 | 117 | 114 | 115 | 116 | 113 | 114 | 104 |
| Tensile strength (MPa) | | 81 | 85 | 87 | 88 | 85 | 85 | 86 | 73 |
| Specific tensile strength (MPa/(g/cm³)) | | 72 | 81 | 82 | 83 | 80 | 80 | 81 | 69 |

TABLE 1-continued

Polyamide 6,6 Resin Compound Material

| | Reference Example 1 | Example 1 | Example 2 | Example 3 | Example 4 | Example 5 | Example 6 | Comparative Example 1 |
|---|---|---|---|---|---|---|---|---|
| Flexural modulus (MPa) | 2503 | 2932 | 2895 | 2870 | 2920 | 2866 | 2867 | 2944 |
| Relative rigidity $((MPa)^{1/3}/(g/cm^3))$ | 12.1 | 13.6 | 13.5 | 13.4 | 13.5 | 13.4 | 13.4 | 13.6 |

Table 2 shows the surface treatment agents that were used in Table 1.

TABLE 2

Surface Treatment Agent

| Symbol | Compound Name | Product Name | Supplier |
|---|---|---|---|
| Al | 3-aminopropyl triethoxysilane | KBE-903 | Shinetsu Chemical |
| PAEm1 | Water soluble polyamide emulsion | Tresin FS-350E5AS | Nagase Chemtex |
| PAEm2 | polyamide emulsion | Sepulsion PA200 | Sumitomo Seika |
| UEm1 | Polyether based urethane emulsion | Chemithylene GA-500 | Sanyo Chemical |
| UEm2 | Polyether based urethane emulsion | Bondic 194ONE | DIC Corporation |
| mPPEm | Maleic anhydride modified PP emulsion | m-pp emulsion MGP-1650 | Maruyoshi Chemical |
| Ep | Epoxy resin | jER 816C/FL240 | Japan Epoxy Resin |

Preparing Polypropylene Resin Composite Samples
Preparing the Surface Treated Hollow Glass Microspheres Surface treated hollow glass microsphere samples 7 through 11 were prepared in accordance with the following method. First, 300 g of glass bubbles (product name: S60HS, product of 3M) was placed in a 14 L metal container and mixed using a mixing blade. While mixing, in accordance with Table 3, the surface treatment agent was sprayed onto the glass bubbles as a mixture (sample 9 contained only silane coupling agent, sample 10 contained only synthetic resin emulsion). After mixing for 5 minutes, the glass bubbles that had adhered to the wall surface of the metal container were removed and stirred into the center part of the sample and then mixed again. Next, after 5 minutes, the surface treated samples were removed, and dried for 1 hour in an oven at 100° C. After drying, the samples were cooled to room temperature and classified using a 500 μm mesh sieve to obtain hollow glass microsphere samples 7 through 11. The materials shown in Table 2 were used as the surface treatment agents shown in Table 3.

Preparing the Polypropylene Resin Composite Sample

Thermoplastic resin composite samples, which were resin composites of polypropylene resins prepared by the following procedures, were prepared using the hollow glass microsphere samples 7 through 11. First, the hollow glass microsphere samples were kneaded into the polypropylene resin using a 30 mm diameter twin screw extruder TEX30α (manufactured by The Japan Steel Works) equipped with a side feeder with L/D=53. The discharge rate of the twin screw extruder was 5 kg/h, the screw speed was 400 RPM, and the resin temperature was set to 220° C. The resin component was provided through a top feeder hole, and the surface treated glass bubbles were added from a side feeder. Herein, a heavy load feeder manufactured by Kubota was used as the top feeder, and a volumetric micro feeder manufactured by Hosokawa Micron was used as the side feeder. The strand that was extruded from the extruding orifice was cooled, cut into 3 mm long pellets, and then dried to obtain pellets of a thermoplastic resin composite of polypropylene resin.

Furthermore, as a comparative example 2, thermoplastic resin composite pellets were obtained by kneading under the same conditions as the example, except that 15 mass % of commercial hollow glass microspheres (product name: S60HS (product without surface treatment), manufactured by 3M) was used.

Injection Molding

Injection molding was performed under the following conditions using the thermoplastic resin composite samples to produce molded body samples. A test strip (80 mm×10 mm×4.0 mm) was formed from the pellet samples that were produced, using a Clocknor F40. The molding conditions were set to a cylinder temperature of 230 to 250° C., a mold temperature of 50 to 60° C., and an injection pressure of 96 MPa or less.

The molded body samples of polypropylene resin composite prepared by the aforementioned methods (examples 7 through 8 and comparative examples 2 through 5) and molded body samples obtained from polypropylene resin that did not contain hollow glass microspheres (reference 2) were evaluated by the same test methods as the molded body samples of the polyamide resin composite. The evaluation results are shown in Table 3. Note that the physical properties of the polypropylene resin were less affected by absorbed moisture as compared to the polyamide resin, and therefore the tests were performed on the molded bodies samples at room temperature and evaluated without controlling the moisture by drying the test pieces.

TABLE 3

Polypropylene Resin Compound Material

|  |  | Reference 2 | Example 7 | Example 8 | Comparative Example 2 | Comparative Example 3 | Comparative Example 4 | Comparative Example 5 |
|---|---|---|---|---|---|---|---|---|
| Polypropylene resin | Mass % | 100 | 85 | 85 | 85 | 85 | 85 | 85 |
| Hollow glass microspheres | Sample No. | — | 7 | 8 | — | 9 | 10 | 11 |
|  | Mass % |  | 15 | 15 | 15 | 15 | 15 | 15 |
| Surface treatment agent | Al (mass %) |  | 1 | 1 | 0 | 1 | 0 | 1 |
|  | mPPEm (mass %) |  | 2 | 4 | 0 | 0 | 1 | 1 |
| Density (g/cm$^3$) |  | 1.04 | 0.95 | 0.95 | 0.95 | 0.95 | 0.95 | 0.95 |
| Weight reducing ratio (%) |  | 0 | 8.7 | 9.0 | 9.6 | 8.7 | 8.7 | 8.7 |
| Flexural strength (MPa) |  | 27.6 | 24.8 | 24.6 | 18.2 | 21.1 | 19.5 | 21.7 |
| Flexural relative strength (MPa/(g/cm$^3$)) |  | 26.5 | 26.1 | 26.0 | 17.4 | 22.2 | 20.5 | 22.9 |
| Flexural modulus (MPa) |  | 1838 | 1789 | 1847 | 1828 | 1711 | 1715 | 1693 |
| Relative rigidity ((MPa)$^{1/3}$/(g/cm$^3$)) |  | 11.8 | 12.8 | 13.0 | 12.9 | 12.6 | 12.6 | 12.6 |

Hollow Glass Microspheres Surface Treatment Process for Polyamide 6 Composites

3M Glass Bubbles S60HS (Amino Silane Treated)

60 kilogram non-treated 3M Glass bubbles S60HS were put into 330 L Henschel mixer and stirred. While stirring, 600 gram "A1" amino silane coupling agent was sprayed on the glass bubbles. After coupling agent was sprayed, the glass bubbles were dried with stirring at 125° C. for 45 min. After drying the bubbles were kept at 20° C. until cooled and then screened through 1 mm and 425 micrometer mesh sieve to remove clumps.

Glass Bubbles 1-2.

3M Glass Bubbles S60HS (amino silane treated) were put into 4.5 L metal mixer and stirred with an agitating blade. While stirring "mPPm" emulsion was sprayed on the glass bubbles. After 3 min stirring, glass bubbles which stuck to the wall were removed and placed back into the center of the mixer and stirred an additional 3 min. Surface-treated glass bubbles were poured into pans and dried in an oven at 100° C. Dried glass bubbles were kept 20° C. until cooled and then screened through 425 micrometer mesh sieve to remove clumps. The type of surface treatment agent, loadings and dry time are seen in Table 4.

Glass Bubbles 3

3M Glass bubbles S60HS (amino silane treated) were put into a 330 L Henschel mixer and stirred. While stirring emulsion was sprayed on the glass bubbles. After spraying the glass bubbles were dried with stirring at 125° C. for 45 min. After drying the bubbles were kept at 20° C. until cooled. Glass bubbles were screened through 1 mm and 425 micrometer mesh sieve to remove clumps. The type of surface treatment agent, loadings and dry time are seen in Table 4.

TABLE 4

|  | Glass bubbles (kg) | Emulsion Product Name | Supplier Name | Emulsion conc (%) | Surface treatment amount (%) | Emulsion amount (g) | Dry time (hrs) |
|---|---|---|---|---|---|---|---|
| Glass bubbles 1 | 0.35 | MGP-1650 | Maruyoshi Chemical | 30 | 0.5 | 5.8 | 0.5 |
| Glass bubbles 2 | 0.35 |  |  |  | 2 | 23.3 | 0.5 |
| Glass bubbles 3 | 30 |  |  |  |  | 2000 | 0.75 |

Preparation of Polyamide 6 Polymeric Composites

Examples 9-10

Surface-treated glass bubbles were compounded with "AMILAN CM1007" (polyamide 6 commercially available from Toray Inc., Tokyo, Japan) on a 30 mm diameter twin screw extruder. 10 wt % surface-treated glass bubbles were added from a side feeder to the extruder. The throughput of the twin screw extruder was 4.5 kg/h with a screw speed of 200 rpm and resin temperature of 256-257° C.

Example 11-12

Surface-treated glass bubbles were compounded with "AMILAN CM 1007" on a 25 mm diameter L/D 41 HK25D unidirectional rotating twin screw extruder (commercially available from Parker Corporation). 10 wt % surface-treated glass bubbles were added from a side feeder to the extruder. The throughput of the twin screw extruder was 6.0 kg/h with a screw speed of 150 rpm and resin temperature of 231-251° C.

Comparative Example 6

"AMILAN CM1007" with no glass bubbles.

Comparative Example 7

Glass Bubbles S60HS (non surface-treated) were compounded with "AMILAN CM1007" as in example 11-12. Glass bubbles loading amount was 10 wt %.

Comparative Example 8

3M Glass bubbles S60HS ("A1" amino silane treated) was compounded with "AMILAN CM1007" as in examples 11-12. Glass bubble loading amount was 10 wt %.

Injection Molding

The injection molding was carried out in the same manner as described above for the polyamide 6,6 examples, except the molding was done using a cylinder temperature of 230-260° C., a mold temperature of 80-86° C. and the injection pressure ranged from 25 to 50 MPa.

Sample Evaluation

Samples (examples 9-12 and comparative examples 6-8 prepared above) were evaluated by the following method. Test pieces were dried in an oven at 100° C. for over 10 hrs. The density of the test pieces was measured using an electronic densimeter (Mirage trading, SD-200L). Flexural strength and flexural modulus were measured using Bend testing machine (Toyo seiki, V10-C). Charpy impact strength was measured by Charpy impact strength tester (Ueshima seisakusho, IM-1200).

Test Results

Density of examples 9-12 are 7-8% lighter than comparative example 1. Specific flexural strength of examples 9-12 was enhanced 23-28% compared with comparative example 1, 15-20% compared with comparative example 2 and 4-8% compared with comparative example 3. Specific rigidity of examples 9-12 was enhanced 15-18% compared with comparative example 1, 2-5% compared with comparative example 2 and 1-4% compared with comparative example 3. On the other hand, the specific tensile strength of the examples were 69-87% of comparative example 1, 83-106% of. comparative example 2 and 88-112% of comparative example 3. As shown in examples 10-12, tensile strength could be controlled by the compounding temperature and the molding temperature. When the compounding temperature and the molding temperature were high, the tensile strength was 12% better than comparative example 2.

TABLE 5

Polyamide 6 Resin Compound Material

| | | Example 9 | Example 10 | Example 11 | Example 12 | Comparative Example 6 | Comparative Example 7 | Comparative Example 8 |
|---|---|---|---|---|---|---|---|---|
| Polyamide 6 resin | Wt % | 90 | 90 | 90 | 90 | 100 | 90 | 90 |
| Glass microscopic hollow spheres | Bubble Number | 1 | 2 | 3 | 3 | | | |
| | Wt % | 10 | 10 | 10 | 10 | 0 | 10 | 10 |
| Compound T/Molding T | | Low/Low | Low/Low | High/Low | High/High | Low/Low | Low/Low | Low/Low |
| Surface treatment agent | Al (wt %) | 1 | 1 | 1 | 1 | 0 | 0 | 1 |
| | mPPEm (wt %) | 0.5 | 2 | 2 | 2 | 0 | 0 | 0 |
| Density (g/cm$^3$) | | 1.05 | 1.04 | 1.04 | 1.05 | 1.13 | 1.06 | 1.05 |
| Weight reducing ratio (%) | | 7 | 8 | 8 | 7 | 0 | 6 | 7 |
| Flexural strength (MPa) | | 121 | 124 | 123 | 120 | 105 | 105 | 116 |
| Flexural relative strength (MPa/(g/cm$^3$)) (Percentage to base material) | | 115 / 123 | 119 / 128 | 118 / 127 | 114 / 123 | 93 / 100 | 99 / 107 | 110 / 119 |
| Tensile strength (MPa)[5] | | 63 | 57 | 66 | 73 | 90 | 69 | 65 |
| Specific tensile strength (MPa/(g/cm$^3$)) (Percentage to base material) | | 60 / 76 | 55 / 69 | 63 / 80 | 69 / 87 | 79 / 100 | 65 / 82 | 62 / 78 |
| Charpy Impact Strength (kJ/m$^2$) | | 1.9 | 1.8 | 2.1 | 2.4 | 3.0 | 2.0 | 2.4 |
| Flexural modulus (MPa) | | 3040 | 3205 | 3123 | 2972 | 2453 | 2852 | 2944 |
| Relative rigidity ((MPa)$^{1/3}$/(g/cm$^3$)) (Percentage to base material) | | 13.8 / 116 | 14.1 / 118 | 14.0 / 118 | 13.7 / 115 | 11.9 / 100 | 13.4 / 112 | 13.6 / 114 |

What is claimed is:

1. A thermoplastic resin composite comprising a host resin selected from a polyamide resin and a polypropylene resin, and further comprising hollow glass microspheres, wherein the hollow glass microspheres are surface treated with from 0.5 to 3 mass % of a silane coupling agent and from 1 to 5 mass % of a synthetic resin emulsion, based on 100 mass % of the hollow glass microspheres, wherein the synthetic resin emulsion is selected from the group consisting of a polyamide emulsion and a maleic acid modified polypropylene emulsion.

2. The thermoplastic resin composite according to claim 1, wherein the silane coupling agent is an amino silane coupling agent.

3. A molded body containing a thermoplastic resin composite according to claim 1.

* * * * *